United States Patent [19]

Buckley et al.

[11] 3,931,084

[45] Jan. 6, 1976

[54] FLUOROCARBON POLYMER COMPOSITIONS, CONTAINING SILICONE FILM BUILDER AND AL, PHOSPHATE, MINERAL ACID ADHESIVE

[75] Inventors: Ronald Peter Buckley, Stevenage; John Wilmar Edwards, Welwyn Garden City; Barry William Farrant, St. Neots, all of England

[73] Assignee: Imperial Chemical Industries Limited, London, England

[22] Filed: June 4, 1973

[21] Appl. No.: 367,005

[30] Foreign Application Priority Data
June 9, 1972 United Kingdom............... 27012/72

[52] U.S. Cl. ..................... 260/29.6 F; 117/132 CF; 117/161 UG; 260/29.6 NR; 260/29.6 MM; 260/29.6 MP
[51] Int. Cl.² .......................................... C08L 27/18
[58] Field of Search.... 260/29.6 F, 29.6 NR, 29.6 R

[56] References Cited
UNITED STATES PATENTS

| | | | |
|---|---|---|---|
| 3,062,764 | 11/1962 | Osdal............................. | 260/29.6 F |
| 3,202,626 | 8/1965 | FitzSimmons et al.......... | 260/29.6 F |
| 3,325,434 | 6/1967 | Tully............................. | 260/29.6 F |
| 3,476,827 | 11/1969 | Engelhardt..................... | 260/29.6 F |
| 3,489,595 | 1/1970 | Brown........................... | 260/29.6 F |
| 3,644,261 | 2/1972 | Strolle.......................... | 260/29.6 F |

FOREIGN PATENTS OR APPLICATIONS 1,226,222   3/1971   United Kingdom

*Primary Examiner*—Harold D. Anderson
*Attorney, Agent, or Firm*—Cushman, Darby & Cushman

[57] ABSTRACT

Fluorocarbon polymer dispersions, capable of providing a thick adherent coating on a substrate by means of a single application, comprise an aqueous dispersion of a fluorocarbon polymer, an adhesive and a film builder.

8 Claims, No Drawings

FLUOROCARBON POLYMER COMPOSITIONS, CONTAINING SILICONE FILM BUILDER AND AL, PHOSPHATE, MINERAL ACID ADHESIVE

This invention relates to fluid compositions containing dispersed fluorocarbon polymer, e.g. polytetrafluoroethylene ("PTFE") which can be applied to substrates as adherent coatings with "non-stick" surface properties.

An established technique for applying PTFE-containing coatings, e.g. to cookware, involves first of all substrate preparation, then application of a PTFE-containing primer coat followed by drying and/or baking the primer coat, after which a PTFE-containing top or finish coat is applied to the primer coat and subsequently dried, the combined coats then being sintered. It has been found in general that the primer coat alone, although it showed good adhesion to the substrate, did not give a thick enough crack free coating for most uses. The top coat on the other hand would, if used alone, have provided a relatively thick crack free coating but it would have given poor adhesion to the substrate in the absence of a primer.

We have now discovered coating compositions which may have the advantageous properties of the PTFE-containing primer and top coats combined and which may therefore provide a "one" coat system which may be applied, e.g. by spraying, subsequently only needing drying, baking and sintering.

According to this invention there is provided an aqueous fluorocarbon polymer-containing composition which is capable of forming coatings on a substrate by a single application which, after drying, baking and sintering, are at least 20 $\mu$m thick without discernible cracks, showing good adhesion to the substrate, non-stick properties and freedom from toxicity. Preferably the composition has a minimum shelf life of 8 weeks. By minimum shelf life we mean the minimum time that a sample of the composition will remain usable when stored in a sealed container at ambient temperatures and rolled at weekly intervals.

Suitably the composition may comprise:
a. a fluorocarbon polymer dispersed in an aqueous medium
b. an adhesive, preferably an inorganic adhesive, dissolved in the aqueous medium to assist adhesion of the fluorocarbon polymer to substrate surfaces, and
c. a film builder.

According to another aspect the invention provides a coating composition comprising a fluorocarbon polymer dispersed in water, an adhesive comprising the species Al, phosphate and a mineral acid dissolved in the water, and a polymeric film builder also dispersed in the water, the fluorocarbon polymer and film builder dispersions being stabilised by a wetting agent, preferably a non-ionic wetting agent.

By fluorocarbon polymers there are included polytetrafluoroethylene (PTFE) and copolymers of tetrafluoroethylene with up to 15 percent by weight of other monomers such as ethylene, vinyl chloride and hexafluoropropene. Preferred fluorocarbon polymers are polytetrafluoroethylene and copolymers of tetrafluoroethylene with up to 5 percent, especially 0.05 to 2 percent, by weight of other monomers such as ethylene, vinyl chloride and hexafluoropropene. Such preferred polymers are subsequently referred to as "TFE resins." It is especially preferred to use an aqueous dispersion of PTFE of median particle size 0.1 to 0.4 $\mu$m. The film builder, which is preferably polymeric in character, is selected to assist the formation of a suitably thick coating without appreciably interfering with the sintering together of the fluorocarbon polymer particles. The film builder may be a silicone resin for example alkyl aryl polysiloxanes such as a methyl phenyl polysiloxane.

One or more of these silicone resins may suitably be incorporated in the compositions of the invention by dissolving them in an organic solvent and emulsifying this solution in water with a wetting agent, preferably a non-ionic wetting agent.

A preferred silicone resin is a commercial methyl phenyl silicone resin supplied as 60 percent by weight solution in toluene. This may advantageously be emulsified in water by use of a non-ionic surfactant such as that sold by Rohm and Haas Company of Philadelphia, U.S.A., as "Triton" DN 65 and described by the suppliers as a modified ethoxylated straight chain alcohol. A high speed mixer should be used to form the emulsion.

The compositions according to the invention are preferably free of chromium compounds which have been used in the past as adhesives for PTFE coating compositions. However, it is an essential part of the invention that an adhesive should be present in the composition. It has been found that good enough adhesion to metal substrates is not obtained by merely incorporating a silicone resin into aqueous PTFE dispersions. Adhesives that may be used are aluminium chloride or aluminum hydroxychloride (chlorohydrate) dissolved in the aqueous composition. Preferably they are mixed with an aqueous fluorocarbon polymer dispersion before this is combined with an aqueous emulsion of the film builder.

Preferred adhesives in the compositions of this invention are materials in ionic or covalent form including the atoms or groups $$Al_a^{III} P_b^V O_c X_d H_e \qquad 1$$

wherein $a$, $b$, $c$ and $e$ are respectively the numbers of the atoms shown and $d$ is the number of the units X, X being halogen e.g. Cl or Br or being considered as derived from a mineral acid by the removal of one or more acidic hydrogen atoms whether a mineral acid as such has been used in the preparation of the adhesive or not (whereby X may also be Cl as well as e.g. SO$_4$ or NO$_3$) characterised in that either the ratio $a:d$ is from 1:0.1 to 1:5 or the ratio $a:b$ is 1:$x$ where $x \leq$ 1.8 or both. The ratio $a:b$ is preferably from 1:0.5 to 1:1.5. The adhesive may be added as a halogen-containing complex phosphate of aluminium containing a chemically bound hydroxy compound R-OH (of which there is preferably at least one molecule per atom of aluminum) where R is a hydrogen atom or an inert organic group (including such complexes in a hydrolysed form). Alternatively it may be present for example in the form of aluminium ions, phosphate ions and the ions of a mineral acid (HCl, H$_2$SO$_4$ or HNO$_3$) in the aqueous medium. Preferably the number of atoms of aluminium to the number of phosphate ions is 1:$x$ where $x \leq$ 1.8.

An adhesive solution may be made in various ways as follows:
a. by the addition of a mineral acid to an aluminium phosphate;
b. by the addition of a phosphoric acid to aluminium chloride, sulphate or nitrate; or c. by the addition of a phosphoric acid and optionally a mineral acid to a material of the formula $Al_fO_g(OH)_hX_j$ wherein X may be Cl, $NO_3$ or $SO_4$ and when X is Cl or $NO_3$ $3f = 2g + h + j$ and when X is $SO_4$ $3f = 2g + h + 2j$; in all cases either g or h but not both may be zero; j may be zero; and the formula represents a single compound or a mixture of compounds, each of which may or may not be hydrated.

The complex aluminium phosphates used in the compositions of the present invention may be made as described in published Dutch Pat. application 70 08594 the relevant disclosure of which is incorporated herein by reference.

As described in the said application, the complex phosphates or a mixture containing the said complex phosphates, for example their solutions, may be prepared, for example, by reacting aluminium or an aluminium compound, preferably a halide, with a hydroxy compound R-OH and phosphoric acid, a phosphoric acid ester or a compound capable of forming phosphoric acid or a phosphoric acid ester. The aluminium halide may be a simple halide or an oxyhalide or an aluminium alkoxy halide, for example aluminium ethoxy chloride. Other suitable aluminium compounds include aluminium alkoxides, for example aluminium ethoxide. When aluminium or an aluminium compound other than a halide is used, the presence of a halogen acid is necessary. Mixtures of hydroxy compounds may be used. Substances capable of forming phosphoric acid or a phosphoric acid ester include phosphorus pentoxide, phosphorus oxyhalides and phosphorus halides. An aqueous solution of phosphoric acid may be used, conveniently an 89 percent solution of orthophosphoric acid in water, although it is preferred to ensure that no more than about 5 percent by weight of water based on the total weight of reaction mixture is present when a complex phosphate containing an organic hydroxy compound is prepared, thereby avoiding a loss of yield.

Further details of the preparation of adhesives and solutions of adhesive of the type represented by the foregoing formula I are described in German specification OLS P.2 161 795.

The amount of the above described aluminium-containing adhesives that is used to give adequate adhesion whilst giving a film thickness of at least 20 μm depends on the particular adhesive. Preferably the adhesives are used in amounts such that the weight of aluminium present per 100 gm of PTFE is chosen from the range 0.2 to 4.5 gm. A more preferred range is 1.0 to 2.5 gm.

Compositions according to the invention may be made by use of a dispersion of the fluorocarbon polymer in water which may be made by a polymerisation process in an aqueous medium or by dispersing a suitably finely divided solid form of the polymer in an aqueous medium.

In the preparation of aqueous dispersions of PTFE made by an aqueous polymerisation process, the tetrafluoroethylene is normally polymerised in the presence of an emulsifying agent, for example by the processes described in U.K. Pat. Specifications Nos. 689 400 and 821 353. The emulsifying agent is preferably of the anionic type in the form of a fluorinated carboxylic acid compound such as ammonium perfluorooctanoate. For use in this invention, after polymerisation, the dispersion is further stabilised by means of a surfactant and, if necessary, concentrated. We have found that the best results are achieved if the additional stabilisation is effected by a non-ionic surfactant such as polyoxyethylated octyl phenol containing 9–10 moles of ethylene oxide per mole of octyl phenol sold by Rohm and Haas Company under the trademark "Triton" X100 or a surfactant sold by Rohm and Haas Company under the trademark "Triton" DN65 and described by the suppliers as a modified ethoxylated straight chain alcohol.

Stabilisation solely by the use of ionic surfactants is desirably avoided.

Use of anionic hydrocarbon stabilisers based on sulphates or sulphonates in PTFE-containing compositions tends to result in PTFE coagulation when complex aluminium phosphate or aluminium phosphate-acid mixtures are added. It is believed that aluminium hydrocarbon sulphates or sulphonates tend to precipitate leaving less stabiliser to stabilise the PTFE.

Alternatively PTFE-containing aqueous compositions may be made by mixing a PTFE powder into an aqueous medium to form a dispersion which is then blended with the adhesive or adhesive solution. Alternatively they may be made by mixing the PTFE directly into an aqueous medium containing the adhesive. A suitable comminution step may also be needed prior to or at the same time as the mixing takes place. The PTFE may be in the form of a lubricant grade powder. By the term lubricant grade PTFE powder we mean a PTFE powder of average particle size of less than 20 μm (as measured optically) that has been prepared by processes including comminution of a high molecular weight PTFE.

Examples of commercially available dry lubricant powders are 'Fluon' L169, L170 and L171 sold by Imperial Chemical Industries Limited. 'Fluon' L170 is a friable PTFE powder of 4 μm median particle size which can be broken down to smaller particle size (as low as 0.1 μm) when processed in various media e.g. by a high shear mixer. Thus 'Fluon' L170 may be added to an aqueous medium and broken down by use of a high shear mixer to produce a colloidal dispersion of the polymer in the medium in which the adhesive is already present or to which it is added subsequently.

The compositions of the invention may contain pigments and/or fillers as well as the components previously described. A preferred manner of making the compositions is to mix a stabilised emulsion of a solution of the film builder plus any pigments or fillers in an aqueous medium with the stabilised aqueous fluorocarbon polymer dispersion containing the adhesive components.

An important technical advantage may be achieved by use of the invention in that a relatively thick crack-free coating showing good adhesion and having the desirable non-stick properties required for example on cookware may be achieved by a single application of the composition without the need to apply an initial primer coat. The coatings may for example be applied to the substrate surface, which has been suitably cleaned, by spraying and, after drying and baking the coating, it may be sintered, suitably at approximately 400°C for PTFE-containing coatings. The coating materials are especially useful for coating aluminium substrates.

It has been found that the choice of stabilisers, and their concentrations, for the aqueous fluorocarbon polymer dispersion and for the emulsion of a silicone resin solution, when a silicone resin is used as a film builder, can have an important effect on the maximum coat thickness that can be obtained, without discernible cracks, from the coating composition. The maximum coat thickness obtainable, otherwise known as the critical film thickness, is at least 20 μm for the compositions of this invention.

While the same surfactant e.g. "Triton" DN65 or "Pluronic" F68 can be used to stabilise both the fluorocarbon polymer dispersion and the silicone resin dispersion, it is possible to achieve a greater critical film thickness by using different surfactants in the composition. It has been found advantageous to stabilise the fluorocarbon polymer dispersion with a surfactant selected from alkoxy derivatives of a phenol or alcohol e.g. "Triton" X100 or "Triton" DN65 and to make up the emulsion of the silicone resin solution using an ethylene oxide propylene oxide block copolymer e.g. "Pluronic" F68 obtainable from BASF Wyandotte.

Using 2 percent by weight of "Pluronic" F68 on the total composition to stabilise the silicone emulsion, the amount of "Triton" DN65 stabilising a PTFE dispersion may be varied from 1 to 3 percent by weight on PTFE, but a preferred quantity is 1 – 2 percent by weight on PTFE.

As the polymer dispersion and the silicone emulsion become mixed in the final composition, stabilisers must of course be chosen for both that will avoid coagulation by the adhesive.

The critical film thickness of our compositions is tested by means of a "Hegman" gauge which is a known apparatus allowing the measurement of the critical film thickness of the coating material. The gauge has a smooth surfaced trough of increasing depth which is filled with the coating composition. In the case of the present compositions, the coating is then dried at 80°C for 15 minutes, baked at 150°C for 15 minutes and sintered at 400°C for 30 minutes. After cooling, the sintered coating is inspected and the point along the gauge is noted at which cracking of the coating begins. The critical film thickness is the thickness of the sintered coating at this point which is measured according to our method by use of a "Permascope." A zero reading is taken on the substrate to which the coating is applied, and a measurement is taken on the coating at the point at which cracking begins. This reading on the "Permascope" is taken as the critical film thickness. Clearly the larger this thickness is, the thicker the crack-free film which can be obtained from the coating composition by application of a single coat.

Adhesion to the substrate is measured as subsequently described in the examples by the adhesive tape test before and after immersing a test plaque in heated oil.

The good shelf life obtainable with compositions of the present invention is believed to be an important advantage because the compositions can be marketed in a single container and can be used without preparation by the fabricator. It is also of importance that non-toxic coatings may be obtained. In preferred formulations, a high proportion of fluorocarbon polymer is obtained in the coating and this gives good release properties.

The invention is further illustrated by reference to the following examples.

EXAMPLE 1

15.5 gms of a commercially available aqueous aluminium hydroxychloride (approximate formula $Al_2(OH)_5Cl$.) solution containing 11.6 percent w/w aluminium and 8.6 percent w/w chloride, were added to 125.5 gms of an aqueous PTFE dispersion containing 81.2 gms PTFE of median particle diameter ca 0.3 μm, and 1.62 gm of a non-ionic stabiliser, "Triton" DN65. To this mixture were added, with stirring, 2.9 gms 36 percent w/w hydrochloric acid and, after cooling to 10°C, 7.3 gms 89 percent w/w orthophosphoric acid. The temperature was maintained below 20°C.

To the above mixture was added an emulsion (prepared in a Silverson Laboratory Mixer No. L2R with 1/32 inch screen) comprising 7.4 gms of the previously described "Triton" DN65, 21.9 gms water, 9.7 gms toluene, 9.7 gms silicone resin solution R282 (a commercial methyl phenyl silicone resin supplied as a 60 percent w/w solution in toluene and sold by Imperial Chemical Industries Limited) and 12.8 gms of an aqueous black pigment paste [this paste is described as Pigment Black Dispersion 3204 and is supplied by Chemical Products Limited, Stockport, Cheshire] containing 3.2 gms carbon black stabilised with a polyethoxylated long chain alcohol.

The mixture was spread on a stainless steel "Hegman" gauge, dried at 80°C for 15 minutes, baked at 150°C for 15 minutes and sintered at 400°C for 30 minutes. Inspection of the coating showed that a thickness of 38 μm could be obtained before the onset of mud cracking. Coating thickness was assessed by Permascope as previously described.

Adhesion was assessed by spraying the mixture onto a plaque of aluminium (previously grit-blasted with 60 mesh alumina) which was then dried at 80°C for 5 minutes, baked at 150°C for 10 minutes, and sintered at 400°C for 10 minutes. For purposes of reference, Permascope readings were taken both on the grit blasted surface and on the surface after coating, the Permascope having been zeroed on a flat smoot surface. The instrument reading was 15 μm for the gritted surface and 24 μm for the coated surface.

The adhesion was assessed according to the following tests:

1. By cutting through the coating and into the metal with a razor blade to give a cross-hatched pattern of cuts providing approximately 3 mm × 3 mm squares over an area of 625 mm². The adhesion of the coating is then assessed by firmly pressing a length of 25 mm wide, pressure-sensitive, adhesive tape over the cross-hatched area and subsequently pulling the tape sharply backwards at an angle of 45° to the direction of application. The application and stripping of tape over the cross-hatched area is repeated with fresh tape until there is evidence that the coating is detaching from the metal or, if no failure is observed, up to a maximum of 15 times.

2. The cross-hatching procedure of test 2 was repeated and the test plaque was then immersed in a vegetable based cooking oil at 200°C for 3 hours. The adhesive tape test is carried out, after washing and drying the plaque, up to a maximum of 15 times.

In the case of the present example, no adhesion failure was seen after 15 applications of tape both before and after the hot oil test. A coating is regarded as showing satisfactory adhesion if it withstands more than 5 applications of tape.

EXAMPLE 2

11.9 gms of a commercially available aqueous aluminium hydroxychloride solution (containing 11.6 percent w/w aluminium and 8.6 percent w/w chloride) were added to 200 gms of an aqueous PTFE dispersion containing 124.6 gms PTFE of median particle diameter 0.29 μm, and 3.2 gms of a non-ionic stabiliser "Triton" DN65. To this mixture were added with stirring, 2.3 gms 36 percent w/w hydrochloric acid and, after cooling to 10°C, 5.6 gms 89 percent w/w orthophosphoric acid.

To the above mixture was added an emulsion comprising 10.5 gms "Triton" DN65, 26.3 gm $H_2O$, 15 gms toluene, 15 gms silicone resin solution R282 and 20.0 gms of an aqueous black pigment paste, as previously described, containing 5.0 gm carbon black stabilised with a polyethoxylated long chain alcohol. The emulsion was prepared using the Silverson Laboratory Mixer No. L2R with the 1/32 inch screen.

The mixture above was sprayed onto plain aluminium plaques and coatings of 40 μm thickness, as assessed by Permascope, free from mud cracks, were obtained after sintering. The composition was thus capable of providing a coating having a critical film thickness greater than 20 μm. Adhesion was assessed by spraying onto aluminium plaques (previously gritted with 60 mesh alumina) dried at 80°C for 15 minutes, baked at 150°C for 15 minutes and sintered at 400°C for 15 minutes. The Permascope reading on the coating was 36 μm and was 20 μm on the grit blasted surface. No adhesion failure was seen after 15 applications of tape, before and after a hot oil test. The hot oil test for this example and for examples 3 to 7 was the same as in Example 1 except that the heating in oil was conducted for 8 hours. A coating is regarded as showing satisfactory adhesion under this test if it withstands more than 5 applications of tape.

EXAMPLE 3

9.5 gms of a commercially available aqueous aluminium hydroxychloride solution (containing 11.6 percent w/w aluminium and 8.6 percent w/w chloride) were added to 191.5 gms of an aqueous PTFE dispersion containing 124.5 gms PTFE of median particle diameter ca 0.3 μm, and 2.98 gms of a non-ionic stabiliser "Triton" DN65. To the mixture were added 1.80 gms 36 percent w/w hydrochloric acid and, after cooling to 10°C, 4.50 gms of 89 percent w/w orthophosphoric acid.

To the above mixture was added an emulsion prepared in the Silverson Laboratory Mixer No. L2R (1/32 inch screen), comprising 15.0 gms toluene, 15.0 gms silicone resin R282, 20.0 gms of an aqueous black pigment paste as previously described containinng 5.0 gms carbon black stabilised with a polyethoxylated long chain alcohol, 10.5 gms "Triton" DN65 and 38.5 gms water.

The mixture was sprayed onto plain aluminium plaques and after drying at a 80°C for 15 minutes, baking at 150°C for 15 minutes and sintering at 400°C for 15 minutes coatings of 36 μm thickness, as assessed by Permascope, were substantially free from surface faults. The critical film thickness was thus greater than 20 μm. Adhesion was assessed by spraying onto aluminium plaques (previously grit blasted with 60 mesh alumina), dried, baked and sintered as for the plain aluminium plaques. The Permascope reading on the coating was 30 μm (20 μm on the grit blasted surface). No adhesion failure was seen after 15 applications of tape before the hot oil test, although after the hot oil test the coating failed on the 13th application of tape. The adhesion was still considered good.

EXAMPLES 4 – 7

Further mixes were prepared in a similar manner to Example 3 but with different proportions. The weights of the various components in grams are tabulated under the four example numbers as follows.

| Example No. | 4 | 5 | 6 | 7 |
|---|---|---|---|---|
| Dispersion (65.0% w/w PTFE and 2.4% w/w Triton DN65 on PTFE) | 191.5 | 191.5 | 191.5 | 191.5 |
| Aluminium hydroxychloride (11.6% w/w aluminium and 8.6% w/w chloride) | 7.1 | 4.8 | 2.4 | 1.2 |
| 36% w/w hydrochloric acid | 1.4 | 0.9 | 0.5 | 0.23 |
| 89% w/w orthophosphoric acid | 3.4 | 2.3 | 1.1 | 0.56 |
| Water | 3.9 | 7.8 | 11.8 | 13.8 |
| Toluene | 15.0 | 15.0 | 15.0 | 15.0 |
| Silicone resin R282 (60% w/w in toluene) | 15.0 | 15.0 | 15.0 | 15.0 |
| Aqueous black pigment paste 25% w/w in water) | 20.0 | 20.0 | 20.0 | 20.0 |
| "Triton" DN65 | 10.8 | 10.8 | 10.8 | 10.8 |
| Water | 38.5 | 38.5 | 38.5 | 38.5 |

These mixtures were sprayed onto plain aluminium plaques then dried at 80°C for 15 minutes, baked at 150°C for 15 minutes and sintered at 400°C for 15 minutes. The following coating thicknesses were obtained substantially free from surface faults:

| Example No. | |
|---|---|
| 4 | 44 μm |
| 5 | 40 μm |
| 6 | 40 μm |
| 7 | 45 μm |

The critical film thickness in each case was therefore greater than 20 μm. Adhesion was assessed by spraying onto aluminium plaques (previously gritted with 60 mesh alumina), dried, baked and sintered as for the plain aluminium plaques.

| Example No | Adhesion failure before hot oil test | Adhesion failure after hot oil test |
|---|---|---|
| 4 | No failure after 15 applications | Failed at the 15th application |
| 5 | No failure after 15 applications | Failed at the 15th application |
| 6 | Failed at the 15th application | Failed at the 7th application |
| 7 | Failed at the 15th application | Failed at the 2nd application |

The adhesion of Examples 4 and 5 were considered good, Example 6 was considered satisfactory and Example 7 was poor.

EXAMPLE 8

15.5 gms of a commercially available aqueous aluminium hydroxychloride solution (containing 11.6 percent w/w aluminium and 8.6 percent w/w chloride) were added to a mixture of 11.7 gms water and 121.9 gms of an aqueous PTFE dispersion containing 81.2 gms PTFE, of median particle diameter 0.26 $\mu$m, and 0.97 gms of a non-ionic stabiliser, "Triton" DN65. To the mixture were added, with stirring, 3.0 gms of 36 percent w/w hydrochloric acid followed, after cooling to 10°C, by 7.3 gms of 89 percent w/w orthophosphoric acid.

ton" DN65 were used to stabilise the PTFE dispersion prior to addition of aqueous aluminium hydroxychloride solution, hydrochloric acid and phosphoric acid.

| Example No. | 8 | 9 | 10 | 11 | 12 |
|---|---|---|---|---|---|
| Added "Triton" DN65 grams | — | 0.3 | 0.6 | 1.0 | 1.3 |
| Total "Triton" DN65 grams | 0.97 | 1.27 | 1.57 | 1.97 | 2.27 |
| Added water grams | 11.7 | 11.4 | 11.1 | 10.7 | 10.4 |

The examples were assessed for adhesion and critical film thickness as in Example 1. The adhesion of Examples 8 – 12, after the hot oil test, was considered satisfactory.

| Example Nos. | % Al in final mix | % Al / PTFE | % "Triton" DN65 in final mix | % "Triton" DN65 / PTFE | CFT $\mu$m | Permascope readings for adhesion sample | | Adhesion tape test (Number of applications needed to cause grid failure) | |
|---|---|---|---|---|---|---|---|---|---|
| | | | | | | Substrate $\mu$m | Substrate + sintered coating $\mu$m | Before hot oil test | After hot oil test |
| 8 | 0.85 | 2.21 | 0.46 | 1.19 | 84 | 16 | 34 | >15 | 14 |
| 9 | 0.85 | 2.21 | 0.60 | 1.56 | 50 | 17 | 40 | >15 | 8 |
| 10 | 0.85 | 2.21 | 0.75 | 1.93 | 80 | 18 | 43 | >15 | 14 |
| 11 | 0.85 | 2.21 | 0.94 | 2.43 | 26 | 18 | 44 | >15 | 6 |
| 12 | 0.85 | 2.21 | 1.08 | 2.80 | 23 | 15 | 28 | >15 | 13 |

An emulsion was prepared using the Silverson Laboratory Mixer No. L2R comprising 38 gms of a 21.1 percent w/w aqueous "Pluronic" F68 solution, 19.4 gms silicone resin R282 (a methyl phenyl silicone supplied as a 60 percent w/w solution in toluene) 19.4 gms toluene and 25.6 gms of an aqueous black pigment paste containing 6.4 gms carbon black stabilised with a polyethoxylated long chain alcohol. 51.2 gms of the emulsion were stirred into the aqueous PTFE dispersion mixture above.

The mixture was spread onto a stainless steel Hegman gauge, dried at 80°C for 15 minutes baked at 150°C for 15 minutes and sintered at 400°C for 30 minutes. The thickness at which the coating began to crack was assessed by Permascope, the instrument reading being 84 $\mu$m.

Adhesion was assessed by spraying onto aluminium plaques (previously grit blasted with 60 mesh alumina) dried at 80°C for 5 minutes, baked at 150°C for 10 minutes and sintered at 400°C for 10 minutes. The Permascope reading on the coating was 34 $\mu$m (gritted surface 16 $\mu$m).

No adhesion failure was noted after 15 applications of tape before hot oil testing but failure after 14 applications of tape was noted after hot oil testing as in Example 1. The adhesion was still considered good.

EXAMPLES 9 – 12

These examples were prepared in the same manner as Example 8 except that increasing amounts of "Tri-

EXAMPLE 13

To 120.7 gms of an aqueous PTFE dispersion containing 81.2 gms PTFE, of median particle diameter 0.24 $\mu$, and 1.02 gms of a non-ionic stabiliser, "Triton" X100 were added 11.6 gms water followed by 14.7 gms of a commercially available aluminium hydroxychloride solution (containing 12.20 percent w/w aluminium and 8.13 percent w/w chloride), with stirring. To the mixture were added, with stirring, 3.3 gms of 36 percent w/w hydrochloric acid followed, after cooling to 10°C, by 7.3 gms of 89 percent w/w orthophosphoric acid.

An emulsion was prepared using a Silverson Laboratory Mixer No. L2R comprising 38.0 gms of a 21.1 percent w/w aqueous "Pluronic" F68 solution, 19.4 gms silicone resin R282 (a methyl phenyl silicone supplied as a 60 percent w/w solution in toluene), 19.4 gms toluene and 25.6 gms of an aqueous black pigment paste, as previously described, containing 6.4 gms carbon black stabilised with a polyethoxylated long chain alcohol. 51.2 gms of the emulsion were stirred into the aqueous PTFE dispersion mixture above.

The critical film thickness and the adhesion were assessed in the same manner as Example 1.

EXAMPLES 14 – 20

These examples were prepared in the same manner as Example 13 except that increasing amounts of "Triton" X100 were used to stabilise the PTFE dispersion prior to addition of the aqueous aluminium hydroxychloride solution, hydrochloric acid and phosphoric acid.

| Example No. | 13 | 14 | 15 | 16 | 17 | 18 | 19 | 20 |
|---|---|---|---|---|---|---|---|---|
| Added 33⅓% aqueous "Triton" X100 grams | — | 0.8 | 1.8 | 2.8 | 3.8 | 4.7 | 6.7 | 11.6 |
| Total "Triton" X100 grams | 1.02 | 1.29 | 1.62 | 1.95 | 2.29 | 2.59 | 3.25 | 4.89 |
| Added water grams | 11.6 | 10.8 | 9.8 | 8.8 | 7.8 | 6.9 | 4.9 | — |

The examples were assessed for adhesion and critical film thickness as in Example 1 The adhesion of Examples 13 – 20, after the hot oil test, was considered satisfactory.

| Example Nos. | % Al in final mix | % Al PTFE | % "Triton" X100 in final mix | % "Triton" X100 PTFE | CFT μm | Permascope readings for adhesion examples | | Adhesion tape test (Number of applications needed to cause grid failure) | |
|---|---|---|---|---|---|---|---|---|---|
| | | | | | | Substrate μm | Substrate + sintered coating μm | Before hot oil test | After hot oil test |
| 13 | 0.86 | 2.21 | 0.49 | 1.26 | 95 | 18 | 35 | >15 | >15 |
| 14 | 0.86 | 2.21 | 0.62 | 1.59 | 70 | 18 | 36 | >15 | 15 |
| 15 | 0.86 | 2.21 | 0.78 | 1.99 | 76 | 22 | 30 | >15 | >15 |
| 16 | 0.86 | 2.21 | 0.93 | 2.40 | 90 | 20 | 34 | >15 | >15 |
| 17 | 0.86 | 2.21 | 1.10 | 2.82 | 85 | 25 | 32 | >15 | >15 |
| 18 | 0.86 | 2.21 | 1.24 | 3.19 | 70 | 18 | 30 | >15 | >15 |
| 19 | 0.86 | 2.21 | 1.56 | 4.00 | 30 | 20 | 40 | >15 | >15 |
| 20 | 0.86 | 2.21 | 2.34 | 6.02 | 30 | 18 | 36 | >15 | >15 |

EXAMPLE 21

To 123.4 of an aqueous PTFE dispersion, containing 81.2 gms PTFE of median particle diameter 0.21 μm, and 0.57 gms of a non-ionic stabiliser, "Triton" DN65, were added 1.2 gms of a 33⅓ percent w/w aqueous "Triton" DN65 solution such that the total "Triton" DN65 in the mixture was now 0.97 gms. To this mixture were added 10.6 gms of water followed, with stirring, by 14.7 gms of a commercially available aqueous aluminium hydroxychloride [$Al_2(OH)_5Cl$] solution (containing 12.20 percent w/w aluminium and 8.13 percent w/w chloride).

An emulsion was prepared using the Silverson Laboratory Mixer No. L2R comprising 38.0 gms of 21.1 percent w/w aqueous "Pluronic" F68 solution, 19.4 gms silicone resin R282 (a methyl phenyl silicone supplied as a 60 percent solution in toluene), 19.4 gms toluene and 25.6 gms of an aqueous black pigment paste, as previously described, containing 6.4 gms carbon black stabilised with a polyethoxylated long chain alcohol. 51.2 gms of the emulsion were stirred into the aqueous PTFE dispersion mixture above.

The critical film thickness and the adhesion were assessed in the same manner as Example 1 and the results are provided in the accompanying table.

EXAMPLE 22

This was prepared in the same manner as Example 21 but the water added was now 17.9 gms and the aqueous aluminium hydroxychloride solution added was now 7.4 gms.

EXAMPLE 23

This was prepared in the same manner as Example 21 but no extra water was added and the aqueous aluminium hydroxychloride solution added was now 29.4 gms.

Examples 22 and 23 were assessed for critical film thickness and adhesion in the same manner as Example 1 and the results are provided in the accompanying table.

| Example Nos. | % Al in final mix | % Al PTFE | Critical Film Thickness μm | Permascope readings for adhesion sample | | Adhesive tape test (Number of applications needed to cause grid failure) | |
|---|---|---|---|---|---|---|---|
| | | | | Substrate μm | Substrate + sintered coating μm | Before hot oil test | After hot oil test |
| 21 | 0.89 | 2.21 | 68 | 13 | 30 | >15 | >15 |
| 22 | 0.45 | 1.11 | 72 | 15 | 27 | >15 | >15 |
| 23 | 1.78 | 4.42 | 20 | 13 | 31 | >15 | >15 |

EXAMPLE 24

To 123.4 gms of an aqueous PTFE dispersion, containing 81.2 gms PTFE of median particle diameter 0.21 μm, and 0.57 gms of a non-ionic stabiliser, "Triton" DN65, were added 1.2 gm of a 33⅓ percent w/w aqueous "Triton" DN65 solution such that the total "Triton" DN65 in the mixture was now 0.97 gms. To this mixture were added 16.2 gms water followed, with stirring, by 8.0 gms of aluminium chloride hexahydrate ($AlCl_3.6H_2O$).

An emulsion was prepared using the Silverson Laboratory Mixer No. L2R comprising 38.0 gms of 21 percent w/w aqueous "Pluronic" F68 solution, 19.4 gms silicone resin R282 (a methyl phenyl silicone supplied as a 60 percent w/w solution in toluene), 19.4 gms toluene and 25.6 gms of an aqueous black pigment paste, as previously described, containing 6.4 gms carbon black stabilised with a polyethoxylated long chain alcohol. 51.2 gms of the emulsion were stirred into the aqueous PTFE dispersion mixture above.

The critical film thickness and the adhesion were assessed in the same manner as Example 1. The results are provided in the accompanying table.

EXAMPLE 25

This was prepared in the same manner as Example 24 but the water added was now 20.2 gms and the aluminium chloride hexahydrate added was now 4.0 gms.

Example 25 was assessed for critical film thickness and adhesion in the same manner as Example 1 and results are provided in the accompanying table.

strate, non-stick properties and freedom from toxicity.

2. A composition according to claim 1, the components being present in amounts such that the composition has a minimum shelf life of 8 weeks.

3. A composition according to claim 1 wherein a solution of the alkyl aryl polysiloxane in an organic solvent is emulsified in the aqueous dispersion of the fluorocarbon polymer containing the adhesive.

4. A composition according to claim 3 wherein the emulsion of the solution of the aryl alkyl polysiloxane in the organic solvent is stabilized with a non-ionic surfactant and the aqueous dispersion of the fluorocarbon polymer containing the adhesive is stabilized with a different non-ionic surfactant.

5. A composition according to claim 1 wherein the adhesive is the composition of aluminum ions, phosphate ions and hydrochloric acid ions.

6. A coating composition according to claim 1 wherein the fluorocarbon polymer is polytetrafluoroethylene, the film builder is the alkyl aryl polysiloxane dissolved in an organic solvent and there are present as stabilizers, at least one alkoxy derivative of a phenol or alcohol and at least one ethylene oxide propylene oxide block copolymer.

| Example Nos. | % Al in final mix | % Al / PTFE | Critical Film Thickness $\mu m$ | Permascope readings for adhesion sample | | Adhesive tape test (Number of applications needed to cause grid failure) | |
|---|---|---|---|---|---|---|---|
| | | | | Substrate $\mu m$ | Substrate + sintered coating $\mu m$ | Before hot oil test | After hot oil test |
| 24 | 0.45 | 1.11 | 60 | 18 | 42 | >15 | >15 |
| 25 | 0.22 | 0.54 | 70 | 15 | 30 | >15 | 10 |

We claim:

1. A liquid coating composition free of chromium compounds consisting essentially of
   a. A solid fluorocarbon polymer dispersed in an aqueous medium;
   b. an adhesive dissolved in the aqueous medium to assist adhesion of the fluorocarbon polymer to substrate surfaces, the adhesive being selected from the group consisting of aluminum chloride, a halogen-containing complex phosphate of aluminum containing a chemically-bound hydroxy compound R-OH where R is a hydrogen atom or an inert organic group and wherein the ratio of aluminum-to-phosphorus is equal to or less than 1.8 and a composition which is constituted by aluminum ions, phosphate ions and the ions of a mineral acid wherein the ratio of the number of atoms of aluminum to the number of phosphate ions is equal to or less than 1.8, the amount of the adhesive being such that the weight of aluminum is from 0.2 to 4.5 gm per 100 gm of fluorocarbon polymer;
   c. a film building amount of an alkyl aryl polysiloxane dispersed in the aqueous medium; and
   d. a stabilizing amount of non-ionic surfactant; the polysiloxane and non-ionic surfactant being present respectively in amounts to insure that the composition will form coatings on a substrate by a single application which, after drying, baking and sintering, are at least 20 $\mu m$ thick without discernible cracks, showing good adhesion to the sub- 7. A liquid coating composition free of chromium compounds consisting essentially of
   a. a solid fluorocarbon polymer dispersed in an aqueous medium;
   b. an adhesive dissolved in the aqueous medium to assist adhesion of the fluorocarbon polymer to substrate surfaces, the adhesive being selected from the group consisting of aluminum chloride, aluminum hydroxychloride, a halogen-containing complex phosphate of aluminum containing a chemically-bound hydroxy compound R-OH where R is a hydrogen atom or an inert organic group and wherein the ratio of aluminum-to-phosphorus is equal to or less than 1.8 and a composition which is constituted by aluminum ions, phosphate ions and the ions of a mineral acid wherein the ratio of the number of atoms of aluminum to the number of phosphate ions is equal to or less than 1.8, the amount of the adhesive being such that the weight of aluminum is from 0.2 to 4.5 gm per 100 gm of fluorocarbon polymer;
   c. a film building amount of an alkyl aryl polysiloxane dispersed in the aqueous medium; and
   d. a stabilizing amount of non-ionic surfactant; the polysiloxane and non-ionic surfactant being present respectively in amounts to insure that the composition will form coatings on a substrate by a single application which, after drying, baking and sintering, are at least 20 $\mu m$ thick without discernible cracks, showing good adhesion to the substrate, non-stick properties and freedom from toxicity.

8. A composition according to claim 5 wherein the adhesive is made by the addition of hydrochloric acid and orthophosphoric acid to aluminum hydroxychloride.

* * * * *

UNITED STATES PATENT OFFICE
CERTIFICATE OF CORRECTION

Patent No. 3,931,084          Dated January 6, 1976

Inventor(s) John Wilmar EDWARDS and Barry William FARRANT

It is certified that error appears in the above-identified patent and that said Letters Patent are hereby corrected as shown below:

In the Heading of the patent:

The name of the first listed inventor, i.e.

"Ronald Peter Buckley" should be deleted.

Signed and Sealed this twenty-seventh Day of April 1976

[SEAL]

Attest:

RUTH C. MASON
*Attesting Officer*

C. MARSHALL DANN
*Commissioner of Patents and Trademarks*